APPERLEY & JOHNSON.
Cotton Harvester.
No. 30,862.
Patented Dec. 11, 1860.
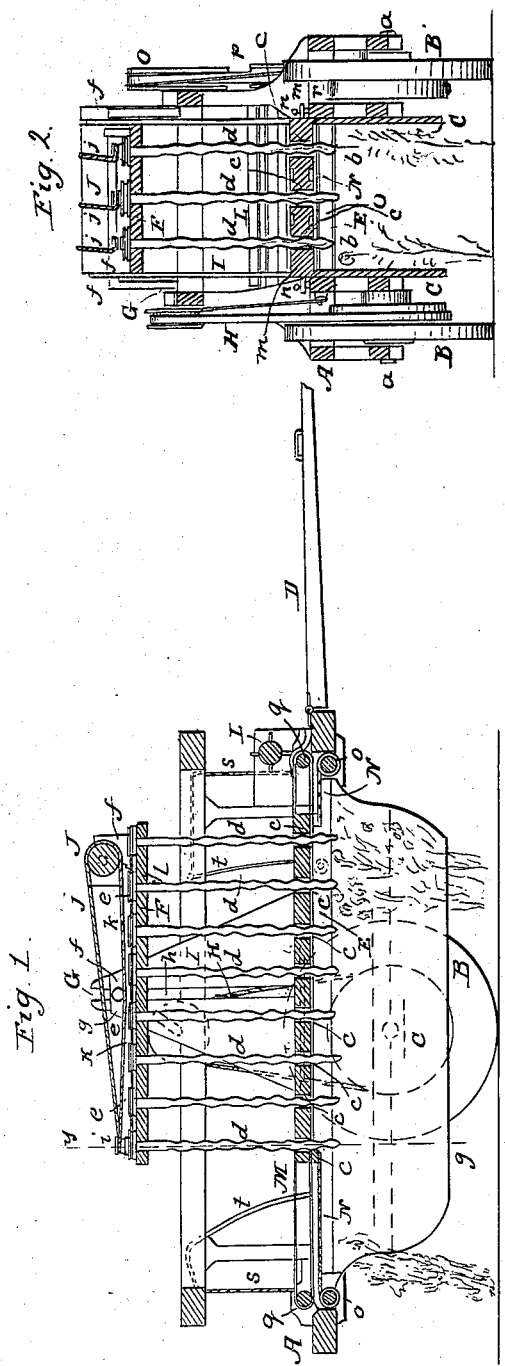
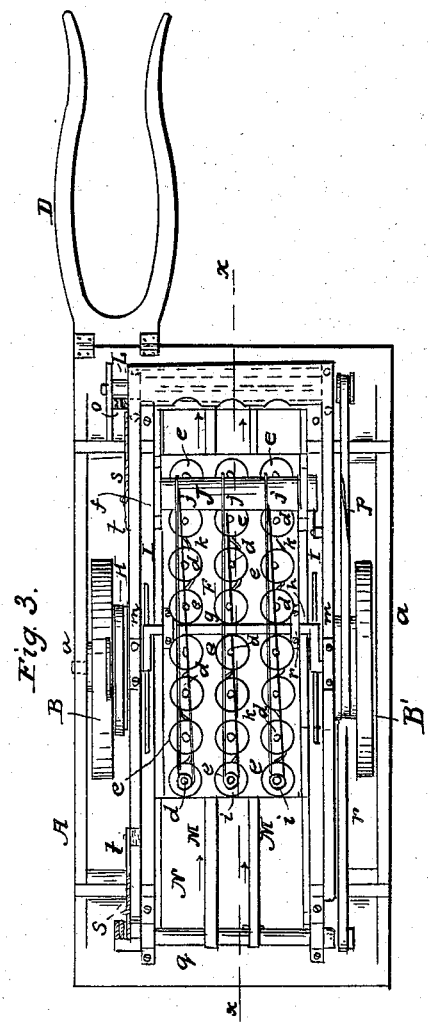

UNITED STATES PATENT OFFICE.

WM. APPERLY AND C. P. JOHNSON, OF MEMPHIS, TENNESSEE.

IMPROVEMENT IN COTTON-HARVESTERS.

Specification forming part of Letters Patent No. 30,862, dated December 11, 1860.

*To all whom it may concern:*

Be it known that we, WILLIAM APPERLY and C. P. JOHNSON, of Memphis, in the county of Shelby and State of Tennessee, have invented a new and Improved Cotton-Harvester; and we do hereby declare that the following is a full, clear, and exact description of the same, reference being had to the annexed drawings, making a part of this specification, in which—

Figure 1 is a side sectional view of our invention, taken in the line $x\ x$, Fig. 3; Fig. 2, a transverse vertical section of the same, taken in the line $y\ y$, Fig. 1; Fig. 3, a plan or top view of the same.

Similar letters of reference indicate corresponding parts in the several figures.

The object of this invention is to obtain a simple and efficient machine for gathering cotton from the standing stalks, so as to supersede the usual manual operation.

The invention consists in the employment or use of rotating pickers having a rising and falling and also a reciprocating movement, and used in connection with aprons and stripping-belts, all being arranged, as hereinafter fully shown and described, to effect the desired end.

To enable those skilled in the art to fully understand and construct our invention, we will proceed to describe it.

A represents a framing of rectangular form, which is mounted on the wheels B B', said wheels being on independent axles $a\ a$.

To the under side of the framing A there are attached longitudinally parallel pendent boards C C, which project down some distance below the axles $a$ of the wheels B B', as shown clearly in Figs. 1 and 2.

D represents the thills, which are attached at one side of the front end of the framing A, as shown clearly in Fig. 3. This arrangement admits of the draft-animal walking in the space between the rows of cotton, while the framing may pass over the rows, the plants being between the wheels B B', as shown more particularly in Fig. 2.

In the framing A there is placed a horizontal plate, E, which is allowed to slide freely between side bars, $b\ b$, of the framing, said bars serving as guides. This plate E is perforated with holes $c$, through which vertical arbors $d$ pass, said arbors being covered with teasels set in a wire covering or arranged in any suitable way. The upper parts of the arbors $d$ pass through a plate, F, and have pulleys $e$ on their upper ends, and the plate F has bearings $f\ f$ attached to its upper surface, in which bearings the crank $g$ of a shaft, G, is fitted. The shaft G is rotated by a belt, H, from the wheel B: or gearing may be used instead.

To each side of the plate E there is attached a vertical plate, I. These plates are slotted vertically, as shown at $h$, and the crank $g$ is fitted therein.

On the front part of the plate F there is placed a roller, J, around which and pulleys $i$ at the upper ends of the arbors $d$, at one end of plate F, cords $j$ pass, and cords $k$ pass around the pulleys $e$ of the arbors. By this arrangement a rotary motion is given the several arbors $d$ from the roller J. Through one end of the roller J a rod, $l$, passes, said rod being fitted loosely in the framing, so that it may rotate therein by the movement imparted to the plate F by the crank $g$. The rod $l$, in connection with the movement of the plate F, rotates the roller J, from which the arbors $d$ are rotated by the means just described. The plate F has imparted to it by the rotations of the crank $g$ a forward and backward and upward and downward curvilinear movement, while the working of the crank $g$ in the slotted upright I communicates a reciprocating movement to the plate E, the latter being retained in proper position by pins $m\ m$, which are attached to the lower parts of the plates I, and work under guide-rods $n\ n$, attached to the framing.

To one end of the crank-shaft G there is attached a pulley, $o$, from which a rotary fan or blower, L, on the front part of the framing is driven by a belt, $p$.

At each end of the framing A there is placed a roller, $q$, around which endless straps M pass, said straps extending over the upper surface of the perforated plate E. These straps M may be covered with fine wire teeth or cards arranged in any suitable way, and the straps may be driven by a belt, $r$, from a pulley on the wheel B'.

To each end of the plate E there is attached an apron, N. These aprons pass around rollers O O at the ends of the framing A, and each roller has a cord, $s$, attached to its outer end, said cords passing through guides and being attached to springs $t$ at the side of the framing, the springs having a tendency to keep the aprons rolled up on the rollers O O.

From the above description it will be seen that as the machine is drawn along the arbors or rotary pickers will descend as they rotate and gather the cotton from the bolls on the standing stalks, and the cotton will be drawn up through the perforations of plate E and stripped from the pickers by the straps M, which move in the direction indicated by the arrows. The cotton is taken from the straps M, and is brushed or blown by blower L into a bag or any proper receptacle attached to the front part of the framing A. The aprons N N, which also receive cotton which may drop from the straps M, have the cotton removed from them by the movement of the plate E, the cotton being discharged from the aprons over the rollers O O into any proper receptacle. The springs $t$ $t$ take up the slack of the aprons N—that is to say, they rotate the roller O as the plate E recedes from them.

In lieu of the belts herein described and represented, gearing may be used, and probably be preferable in a majority of cases. Gearing of course would be attended with more expense in constructing the machine; but it operates much better. Belts are liable to become loose and liable to injury from moisture.

The pendent boards C C serve as guards, keeping the standing cotton-stalks, the wheels B B', and also keeping the cotton in proper position to be acted upon by the picker, the latter passing down between them, as shown in Fig. 2.

This machine may be drawn by horses; or it may be propelled by steam or other motor. It may be constructed at a moderate cost. The draft also will be light, so that a team may readily draw and operate a medium-sized machine without being overtaxed.

The wheels B B' must be sufficiently broad to insure a proper degree of traction to operate the working parts.

Having thus described our invention, what we claim as new, and desire to secure by Letters Patent, is—

1. The reciprocating plate E, picker $d$, and plate F, when combined and arranged to operate as herein shown and described—to wit, the pickers $d$, having a rotary and also a reciprocating and rising and falling movement, as and for the purpose herein set forth.

2. The arrangement of the crank-shaft G, slotted uprights I I, plate F, roller J, and the belts $j$ $k$ or their equivalents, all being arranged, substantially as shown, for the purpose of giving the proper movement to the pickers $d$.

3. In connection with plates E F and pickers $d$, the endless straps M, blower or brush L, and aprons N N, arranged for joint operation, as and for the purpose herein set forth.

WM. APPERLY.
CALVIN P. JOHNSON.

Witnesses:
W. J. HAUSELMANN,
F. M. MARTIN.